US011181372B2

(12) United States Patent
Seshia et al.

(10) Patent No.: US 11,181,372 B2
(45) Date of Patent: Nov. 23, 2021

(54) GRAVIMETER OR INERTIAL SENSOR SYSTEM USING A RESONANT SENSOR AND METHOD OF OPERATING A GRAVIMETER OR INERTIAL SENSOR SYSTEM

(71) Applicant: Cambridge Enterprise Limited, Cambridge (GB)

(72) Inventors: Ashwin Seshia, Cambridge (GB); Xudong Zou, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 372 days.

(21) Appl. No.: 16/307,606

(22) PCT Filed: Jun. 8, 2017

(86) PCT No.: PCT/GB2017/051663
§ 371 (c)(1),
(2) Date: Dec. 6, 2018

(87) PCT Pub. No.: WO2017/212272
PCT Pub. Date: Dec. 14, 2017

(65) Prior Publication Data
US 2019/0301870 A1  Oct. 3, 2019

(30) Foreign Application Priority Data
Jun. 8, 2016  (GB) .................................... 1610043

(51) Int. Cl.
*G01C 19/5776* (2012.01)
*G01P 15/097* (2006.01)
*G01V 7/00* (2006.01)

(52) U.S. Cl.
CPC ........ *G01C 19/5776* (2013.01); *G01P 15/097* (2013.01); *G01V 7/005* (2013.01)

(58) Field of Classification Search
CPC ............ G01C 19/5776; G01C 19/5607; G01P 15/097; G01V 7/005; G01N 9/002; G01N 29/022
(Continued)

(56) References Cited

U.S. PATENT DOCUMENTS 4,130,792 A  12/1978 Sullivan
4,965,532 A  10/1990 Sakurai
(Continued)

FOREIGN PATENT DOCUMENTS

GN  20131697613 A  4/2014
WO  2014175902 A1  10/2014

OTHER PUBLICATIONS

Springer, Oliver; The International Preliminary Report on Patentability; PCT/GB2017/051663; The International Bureau of WIPO; 10 pages; dated Dec. 20, 2018.
(Continued)

*Primary Examiner* — Tarun Sinha
(74) *Attorney, Agent, or Firm* — Todd Allen Serbin; Nexsen Pruet, LLC

(57) ABSTRACT

A gravimeter or inertial sensor system and method of operating such a system is provided. The system comprises a variable frequency signal source (100, 101, 102) configured to provide first and second signals, a resonant sensor (103) connected to receive the first signal, a phase comparator (111) connected to the output of the resonant sensor and to receive the second signal, and a controller (114) connected to the phase comparator. In a first mode, the controller controls the desired frequency of the signals from the variable frequency signal source based on a value of the phase comparator output signal to lock the frequency of the input signals to a resonant frequency of the resonant sensor. In a second mode, the controller disconnects from the
(Continued)

variable frequency signal source and records an open loop output signal indicative of the physical parameter to be measured based on the response of the resonant sensor.

25 Claims, 4 Drawing Sheets

(58) Field of Classification Search
USPC ...................................................... 73/504.16
See application file for complete search history.

(56) References Cited

U.S. PATENT DOCUMENTS

| | | | |
|---|---|---|---|
| 7,839,227 | B2 | 11/2010 | Schwarz et al. |
| 2010/0156629 | A1* | 6/2010 | Sexton .................. G01D 21/00 340/540 |
| 2013/0192372 | A1 | 8/2013 | Colinet et al. |
| 2013/0298675 | A1 | 11/2013 | Thiruvenkatanathan et al. |
| 2016/0018466 | A1* | 1/2016 | Miklosovic ............. H02P 23/14 702/182 |
| 2016/0061708 | A1* | 3/2016 | Kravitz .................. G01N 11/16 73/54.41 |
| 2016/0131600 | A1* | 5/2016 | Pate ........................ G01J 3/453 250/339.08 |
| 2017/0356803 | A1* | 12/2017 | Bertoldi .................... G01V 7/06 |

OTHER PUBLICATIONS

Nallatamby et al.; "Phase Noise in Oscillators—Leeson Formula Revisited"; IEEE Transactions on Microwave Theory and Techniques, vol. 51; No. 4; 11 pages; dated Apr. 2003.

Jennings, Stephen; UKIPO Search Report; GB1610043.0; 3 pages; dated Dec. 6, 2016.

Kaveckaite, Ausra; The International Search Report and the Written Opinion; PCT/GB2017/051663; ISA/EPO; 16 pages; dated Sep. 1, 2017.

Gretillat, Florence et al.; "Improved Design of a Silicon Micromachined Gyroscope with Piezoresistive Detection and Electromagnetic Excitation"; Journal of Microelectromechanical Systems; IEEE Service Center; US; vol. 8; No. 3; Sep. 1999; pp. 243-249.

\* cited by examiner

GRAVIMETER OR INERTIAL SENSOR SYSTEM USING A RESONANT SENSOR AND METHOD OF OPERATING A GRAVIMETER OR INERTIAL SENSOR SYSTEM

FIELD OF THE INVENTION

The present invention relates to the field of resonant sensors. In particular, the invention relates to an electronics control and measurement circuit incorporating a resonant sensor for gravity sensing or an inertial sensor system such as an inertial navigation system.

BACKGROUND TO THE INVENTION

A micro-electro-mechanical systems (MEMS) resonant sensor typically comprises one or more movable mechanical microstructures whose motional response is a function of an input measurand and two sets of electromechanical transduction elements. The first set of electromechanical transduction elements generates a force on the moveable mechanical microstructures to move them. The second set of electromechanical transduction elements detects the movement of the moveable mechanical microstructures. The output signal from the resonant sensor corresponds to a shift in resonant frequency, variation of the vibration amplitude or phase responses of the moveable mechanical microstructure, or a combination of these responses. The output varies in accordance with changes in a physical or chemical quantity to be measured. The actuated transduction carried out by the first set of elements may, for example, correspond to an electrostatic, magnetic, thermomechanical or even piezoelectric actuation. The detection transduction done by the second set of elements may, for example, correspond to a capacitive, piezoresistive, magneto motive or piezoelectric detection.

In the past few decades, micro-machined resonant sensors have been widely used for numerous applications ranging from bio-molecular and chemical diagnostics, to high-precision force, mass, strain, acceleration and charge sensing. The prior art measurement systems using resonant sensors include self-sustained oscillators, frequency locked loops and open-loop phase measurements.

Self-sustained oscillators measure the resonant frequency of a resonant sensor dynamically by embedding the resonant sensor in a positive feedback loop. The measurement of the variation of the resonant frequency of the microstructure can be used to deduce the input measurand of the sensor. A self-sustained oscillator loop and associated readout electronics typically comprises a resonant sensor, electronics composed of an amplifier and a phase shifter, and a frequency counter. An example of this is described in US 2013/0192372. The electronics compensates for the attenuation in gain (using the amplifier) and the phase shift (using the phase shifter) introduced by the resonant sensor to satisfy the loop oscillation conditions, so that the resonant frequency of the resonant sensor can be dynamically measured, for example, by using the frequency counter.

A phase locked loop can also be used to measure the resonant frequency of a resonant sensor. A conventional phase locked loop comprises a resonant sensor, an amplifier, a phase comparator, a filter and a voltage-controlled oscillator (VCO) connected in series in a loop. The VCO provides two input signals, the first is sent to the actuation transduction elements of the resonant sensor and the second is sent to a first input of a phase comparator. The signal from the detection transduction elements of the resonant sensor is sent to a second input of the phase comparator. The output signal from the phase comparator is used to control the VCO after passing through the filter. In such a system, the output frequency of the VCO slaves onto the resonant frequency of the resonant sensor. The resonant frequency of the resonant sensor is measured at the output of the filter, for example by a voltage meter, or at the output of the VCO, for example by a frequency counter.

The components in a frequency locked loop may be altered. One example is described in CN 103728494A. In CN 10372849A, a frequency locked loop replaces the VCO with a direct digital synthesizer (DDS), the phase comparator is removed and a computer controlled data acquisition card is added to slave the output frequency of the DDS to the resonant frequency of the resonant sensor to enable the measurement.

Open-loop phase measurement systems operate differently. An open-loop phase measurement system actuates the resonant sensor using a signal generator and measures the relative phase difference between the output signal of the resonant sensor and the actuation signal. The measured phase difference can be used to deduce the input measurand of the sensor.

Each of these three types of measurement systems for resonant sensors have limitations. The self-oscillating loop and frequency locked loop utilise feedback schemes and therefore suffer from phase-noise conversion. An oscillator inherently converts the phase noise of its internal components into frequency noise, resulting in a degradation in near-carrier noise spectral density. This effect is known as the 'Leeson Effect' and results in an increased noise floor of the resonant sensor, consequently restricting the applicability or resolution of the resonant sensor to measure ultra-low frequency (typically <1 Hz) or quasi-static variation of the input measurand.

The open-loop phase measurement overcomes the 'Leeson Effect' but it can only effectively measure the resonant sensor responses within approximately a 3-dB bandwidth, consequently restricting the dynamic range of the resonant sensor. Also, it requires the actuation signal frequency be manually tuned to the resonant frequency of resonant sensor when starting the measurement, which impacts the practicability of this system for applications requiring automatic, remote sensing.

Moreover, these three types of measurement systems for resonant sensors are useable only to measure the resonant frequency or phase response variation of a resonant sensor. This consequently restricts their applicability to measure amplitude variation of signals from resonant sensors.

SUMMARY OF THE INVENTION

The invention is defined in the appended independent claims, to which reference should be made. Preferred aspects of the invention are defined in the dependent claims.

The invention provides a resonant sensor based measurement system that is able to better measure ultra-low frequency (typically <1 Hz) or quasi-static variation of the input measurand. The invention offers improved dynamic range and practical usability compared to prior art open-loop phase measurement systems for resonant sensors.

In a first aspect, a gravimeter or inertial sensor system comprises:

a variable frequency signal source, configured to provide a first input signal from a first port and a second input signal from a second port, the first and second input signals having a desired frequency;

a resonant sensor, connected to the variable frequency signal source to receive the first input signal, the resonant sensor having a resonant frequency, a phase or an amplitude response that is dependent on a physical parameter to be measured;

a phase comparator or amplitude comparator connected to an output of the resonant sensor and to the second port of the variable frequency signal source to receive the second input signal, and configured to compare a phase or amplitude of an output signal from the resonant sensor with a phase or amplitude of the second input signal from the variable frequency signal source to provide a phase or amplitude comparator output signal;

a controller connected to the phase comparator or amplitude comparator, the controller configured in a first mode to connect to the variable frequency signal source and to control the desired frequency of the first and second input signals from the variable frequency signal source based on a value of the phase comparator or amplitude comparator output signal to lock the frequency of the first and second input signals to a resonant frequency of the resonant sensor, and in a second mode, after the frequency of the first and second input signals has been locked to the resonant frequency of the resonant sensor, to disconnect from the variable frequency signal source and to record an open loop output signal indicative of the physical parameter to be measured based on the response of the resonant sensor.

The controller may be configured such that if the open-loop measurement exceeds a threshold value, the controller switches back to the closed loop mode.

The open loop output signal may be a phase difference, an amplitude difference, a frequency, or a combination of two or more of a phase difference, an amplitude difference and a frequency.

The physical parameter to be measured may be referred to as the input measurand. The physical parameter may be an acceleration.

A closed loop mode monitors its output and compares the actual output to the desired output and if required, brings the output of the system back to the desired response. In the first aspect of the invention, the system is configured to operate so that the signal frequency of the variable frequency signal source is synchronised to the current resonant frequency of the microstructure of the resonant sensor. By making a measurement of the phase shift or amplitude shift of the output signal from the resonant sensor relative to the input signal from the signal source, the resonant sensor based measuring system resolves the 'Leeson Effect' issue found in other closed loop measurement systems, which restricts the resolution of the resonant sensor when measuring ultra-low frequency (typically <1 Hz) or quasi-static variation of the input measurand. The system can be advantageously configured to operate the closed loop mode automatically. By making the signal source frequency synchronised to the resonant frequency of the resonant sensor automatically, the resonant sensor based measuring system of the invention improves the dynamic range of measurement and facilitates the measurement process, compared to typical open loop phase measurement systems for resonant sensors.

It is possible to use a phase or amplitude comparison in the first phase to synchronise to the resonant frequency of the resonant sensor. However, a phase comparison is preferred in practice.

The system is configured so that in a second stage of measurement, the frequency and phase of the variable frequency signal source are fixed and a phase shift, an amplitude difference or a frequency shift between the output signal of the resonant sensor and the input signal from the variable frequency signal source are measured and recorded by the controller. If the measured phase shift, amplitude difference or frequency shift exceeds a pre-set value, the measurement system may return to the first stage to re-synchronise the signal frequency of the variable frequency signal source. The measurement of the input measurand is obtained from both the signal source output frequency and the measured phase shift, amplitude difference or frequency shift. The advantage of the open loop mode is that it has a high accuracy and so is used to gain an accurate reading from the sensor.

The variable frequency signal source may provide time variable voltage or current signals. The variable frequency signal source may be programmable. Programmable in this context means the magnitude, phase and frequencies of the input signals from the signal source can be set separately by a feed-in command code or signal.

The variable frequency signal source may be a direct digital synthesiser (DDS). The variable frequency signal source may comprise a quartz clock.

The variable frequency signal source may comprise a signal splitter, wherein the signal splitter generates at least the first and second input signals.

The system may comprise a first amplifier connected between the resonant sensor and the phase comparator. Any suitable amplifier style may be used, such as a trans-impedance amplifier.

The system may comprise further signal processing components, such as a second amplifier connected between an output of the first amplifier and the phase comparator.

The system may comprise a first low pass filter connected between the amplifier and the phase comparator.

The system may comprise a first comparator connected between the amplifier and the phase comparator. The first comparator may be configured to operate as a waveform converter, converting an output from the resonant sensor into a square wave for example.

The system advantageously comprises a phase shifter connected between the variable frequency signal source and the phase comparator.

The system may comprise a second comparator connected between the phase shifter and phase comparator.

The system may comprise a feed through signal canceller connected in parallel to the resonant sensor, between the variable frequency signal source and the amplifier. The feed through signal canceller may comprise a phase inverter and a tuneable capacitor. Alternatively, the feed through signal canceller may comprise a differential amplifier which has a non-inverting input connected to a port of the variable frequency signal source, an inverting input connected to a DC reference, a non-inverting output connected to an input of the resonant sensor and an inverting output connected to an output of the resonant sensor through a tuneable capacitor.

The system may comprise a second low pass filter connected to an output of the phase comparator.

The system may comprise an analogue-to-digital convertor (ADC) connected to an output of the phase comparator. The low pass filter may be connected between the phase comparator and the ADC.

The system may comprise an amplitude or magnitude comparator connected in parallel to the phase comparator. The amplitude comparator may be connected between an output of the resonant sensor and the controller and between the second port of the variable frequency signal source and the controller.

The system may comprise a second analogue-to-digital convertor (ADC) connected between the amplitude comparator and the controller.

The system may comprise a third low pass filter connected between the amplitude comparator and the controller, and preferably between the amplitude comparator and the second analogue-to-digital convertor.

The controller may comprise a memory. The controller may comprise a data logger. The controller may be configured to record frequency measurements in the memory. The controller may be configured to record measurements of the input measurand in the data logger.

The controller may comprise a programmable logic circuit. The controller may comprise a control output circuit for connection with the variable frequency signal source. The controller may comprise a data output circuit for interfacing with the data logger. The controller may comprise a local clock.

The resonant sensor may comprise a MEMS resonant sensor. The resonant sensor may comprise a movable mechanical microstructure whose motional response is a function of an input measurand. In this context, the motional response means the amplitude and/or phase responses of the microstructure when subject to a known excitation signal. The advantage of a resonant sensor is its high accuracy and additionally its low cost when micro-machined. The resonant sensor may be a mode-localised resonant sensor. An example of a mode-localised resonant sensor is described in WO2011/148137. The resonant sensor may comprise two or more mechanical microstructures that are weakly coupled, whose motional response is a function of an input measurand. One or more of the mechanical microstructures may be exposed to an environment to be measured. Alternatively, the resonant sensor may be a double or triple axis MEMS accelerometer, such as described in WO2014037694.

The resonant sensor may comprise at least one electromechanical transduction element for actuation, which is connected between the first port of the variable frequency signal source and the mechanical microstructure. The resonant sensor may comprise at least one electromechanical transduction element for detection, one port of which is attached to the mechanical microstructure and the other port of which is connected to the phase comparator.

In a second aspect of the invention, there is provided a method of operating a gravimeter or inertial sensor system, the gravimeter or inertial sensor system comprising a resonant sensor, the resonant sensor having a resonant frequency or amplitude response that is dependent on a physical parameter to be measured, and a variable frequency signal source connected to an input of the resonant sensor and configured to provide an input signal having a desired frequency to the input of the resonant sensor, the method comprising:

controlling the variable frequency signal source in a closed loop mode to lock the frequency of the input signal to a resonant frequency of the resonant sensor, and after the frequency of the input signal has been locked to the resonant frequency of the resonant sensor, recording an open loop measurement of a response of the resonant sensor.

The step of recording an open loop measurement may comprise recording the phase response of the resonant sensor.

The step of recording an open loop measurement may comprise recording the amplitude response of the resonant sensor.

The method may further comprise returning to the closed loop mode if the open loop measurement exceeds a threshold value.

The gravimeter or inertial sensor system may be a system in accordance with the first aspect of the invention.

The system and method of the invention may be used in the field of inertial sensing, such as in an accelerometer or gyroscope, gravity or tilt sensing, or as a seismometer. One advantage of the system and method of the invention is the high stability of the obtained measurements. Another advantage of the invention is the low noise in the obtained measurements. The system and method of the invention is particularly advantageous for measuring low frequency or gradual changes in an environment, such as changes in specific gravity in an oil or gas well.

It should be clear that features described in relation to one aspect of the invention may equally be used in other aspects of the invention. It should also be obvious to the skilled person that an input signal would also be an output signal in some other position in the circuit.

BRIEF DESCRIPTION OF THE DRAWINGS

Embodiments of the present invention will now be described, by way of example only, with reference to the accompanying drawings, in which.

DETAILED DESCRIPTION

Figure 1:
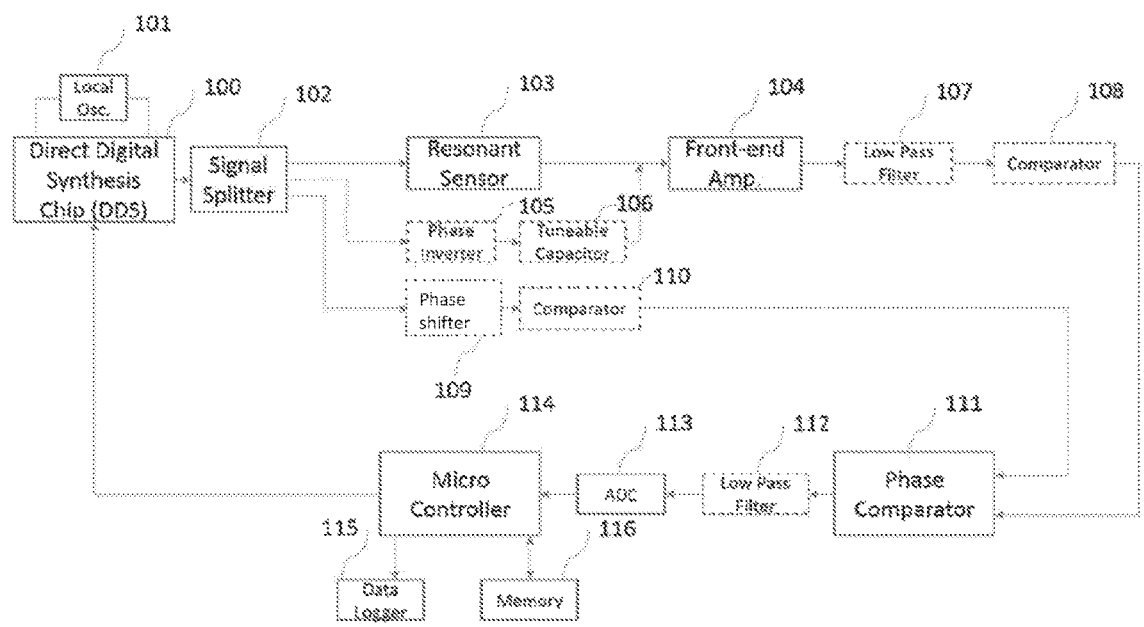
FIG. 1 is a schematic illustration of one embodiment of a measurement system in accordance with the invention.

FIG. 1 is a schematic illustration of a measurement system for resonant sensor in accordance with an embodiment of the invention.

The system comprises a variable frequency signal source. The variable frequency signal source in this embodiment comprises a direct digital synthesiser (DDS) chip 100. The variable frequency signal source in this embodiment comprises a local oscillator as a reference clock signal 101. The frequency of the reference clock signal determines the programming accuracy of the output frequency of the DDS chip. The variable frequency signal source also comprises a signal splitter 102. The signal splitter provides three identical but isolated input signals, one to each of three ports.

Figure 4:
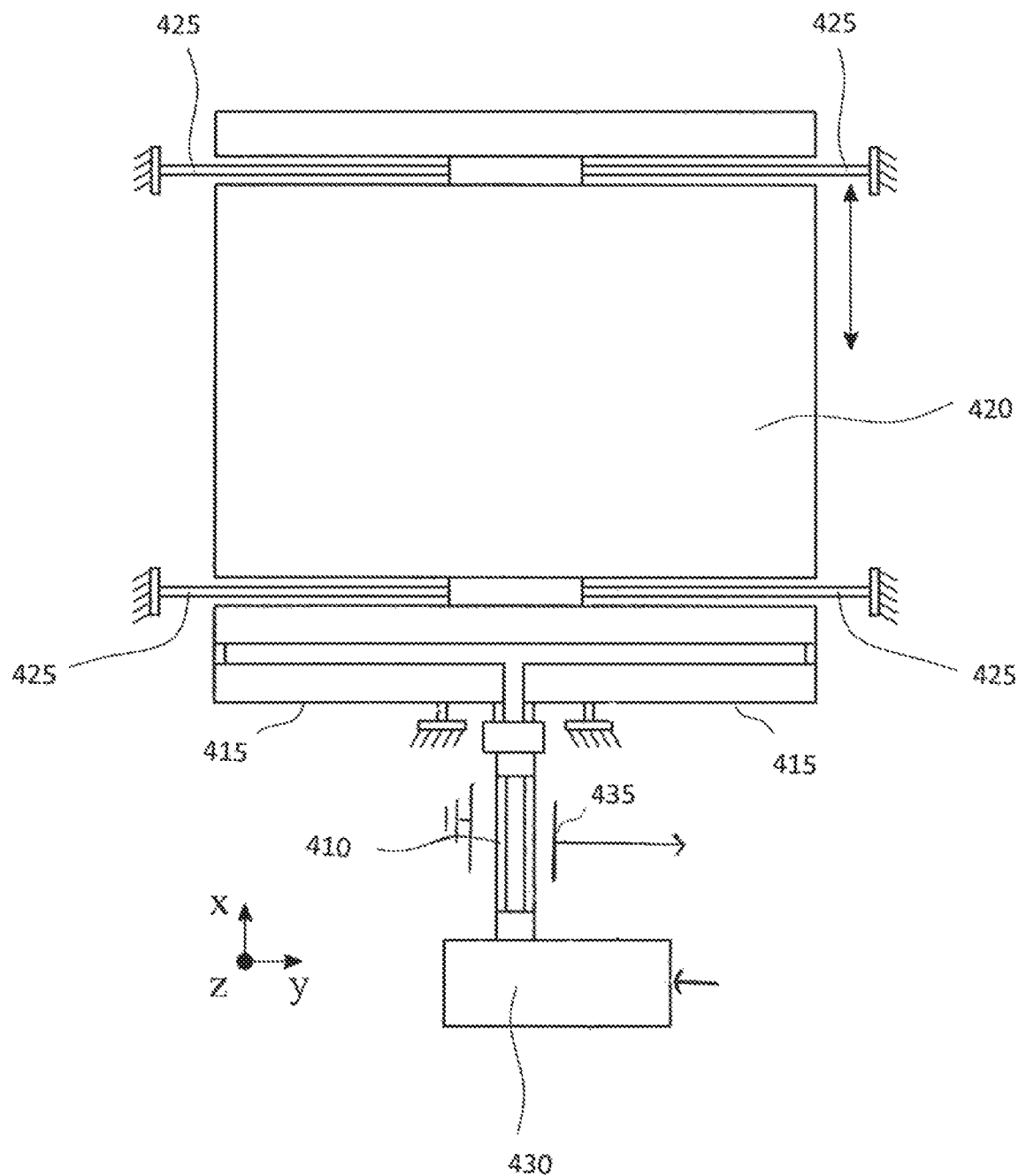
FIG. 4 is a schematic illustration of an exemplary resonant sensor.

The system comprises a resonant sensor 103 connected to a first port of the resonant sensor. The first input signal is provided to a electromechanical transduction element of the resonant sensor 103. The resonant sensor in this embodiment is illustrated in FIG. 4. FIG. 4 is a schematic plan view of the sensor. The resonant sensor is formed from etched silicon. The resonant element 410 is a dual ended tuning fork (DETF) resonator. The DEFT resonator 410 is connected at one end to a proof mass 420 through a lever 415. The proof mass 420 is suspended from a frame by flexures 425. The lever 415 is provided to amplify the output signals. The resonator 410 is driven by an input voltage signal from electrode 430. The response or output from the sensor can be read from an electrode 435. Changes in the environment surrounding the proof mass 420 affect the resonant response of the sensor. The sensor shown in FIG. 4 is just one example of a suitable resonant sensor, any electrically driven resonant sensor providing an electrical output can be used. Another suitable sensor is described in U.S. Pat. No. 5,969,249, for example.

The system comprises an amplifier 104, to which the electromechanical transduction element of the resonant sensor is connected. An output of the amplifier is connected to a phase comparator 111.

The system shown in FIG. 1 further comprises a phase inverter 105 and a tuneable capacitor 106, which together act as a feed through signal canceller, connected across the resonant sensor. The output signal from the phase inverter and the tuneable capacitor add to the output signal of the resonant sensor. A feed through signal canceller cancels out feed through signal which would otherwise attenuate the signal from the detection element of the resonant sensor.

The system of FIG. 1 also comprises a low pass filter 107 and comparator 108. The low pass filter removes high order components from the output signal from the resonant sensor and amplifier. The comparator converts the amplified signal waveform to square-wave format with constant magnitude.

A phase shifter 109, which imposes a set phase difference between the output signal of the first comparator 108 and the output of the phase shifter, is provided between the second port of the signal splitter and the phase comparator. The system also comprises a comparator 110 connected to the output of the phase shifter 109. The comparator 110 acts as a waveform regenerator. The phase shifter and comparator together form a phase tuning stage. They introduce a phase shift that compensates for phase shifts that arise in the signal path from the first port of the signal splitter to the resonant element and from the resonant element to the phase comparator. The amount of phase shift can be calibrated in a set up procedure.

The phase comparator 111 compares the phase of the signal from the first comparator 108 and the second comparator 110. The output of the phase comparator is a quasi-DC voltage output proportional to the relative phase difference between the first comparator 108 and the second comparator 110. This relative phase difference is indicative of a difference between the frequency of the input signals and the resonant frequency of the resonant sensor in the existing conditions. The resonant frequency of the resonant sensor is dependent on the input measurand. For example, the input measurand may be the density of the fluid surrounding the resonant sensor.

The system comprises an analogue-to-digital convertor (ADC) 113 to convert the output from the phase comparator to a digital signal suitable for the microcontroller 114. The system may also comprise a second low pass filter 112 between the phase comparator 111 and the ADC 113.

The microcontroller 114 receives the signal from the ADC 113. The value of the signal from the ADC is indicative of how close the frequency of the signals from the DDS is to the resonant frequency of the resonant sensor. The microcontroller comprises a memory 116. The microcontroller further comprises a data logger 115. The data logger is used to record measurements taken by the system. The memory 116 is used to store operating parameters for the system and in particular the current frequency of the input signals. The microcontroller is connected to the DDS chip 100. In a closed loop mode, signals from the microcontroller are used to change the frequency of the input signals generated by the DDS.

The system shown in FIG. 1 operates in closed loop and open loop modes. In closed loop mode, the frequency of the input signals is adjusted based on instructions from the microcontroller in order to synchronise with the resonant frequency of the resonant sensor. In the open loop mode, the microcontroller does not feedback to the DDS. Instead, the frequency of the input signals is fixed and a measurement is taken by the microcontroller.

Initially, the system operates in the closed loop mode. In the closed loop mode the frequency of the input signals is continually adjusted until the output of the phase comparator 111 indicates that the phase difference between its two input signals equals the pre-set phase difference in the phase shifter 109. This means that the input signals from the DDS 100 are synchronized to the current resonant frequency of resonant sensor 103. When this synchronisation has been achieved, the microcontroller 114 saves the current control key of the DDS to its memory and disables the control key update for the DDS to make the measurement system enter the open loop measurement mode. Otherwise, the microcontroller 114 sends a new control key to the DDS to change the frequency, amplitude and/or initial phase of the output signal of the DDS 100 until the output signal of the DDS 100 is synchronized to the current resonant frequency of resonant sensor 103.

In the open loop measurement mode, the microcontroller calculates the input measurand from the measured phase difference from the phase comparator and the current signal frequency saved in the memory. The microcontroller continuously sends the input measurand data to the data logger. The microcontroller also continuously compares the measured phase difference to a pre-set threshold phase value, for example 60°. If the measured phase difference exceeds that of the threshold phase value, which means the variation of input measurand is beyond the current open-loop measurement range, the microcontroller enables the control key update to the DDS, stops data logging, and the system returns to the closed loop mode.

Figure 3:
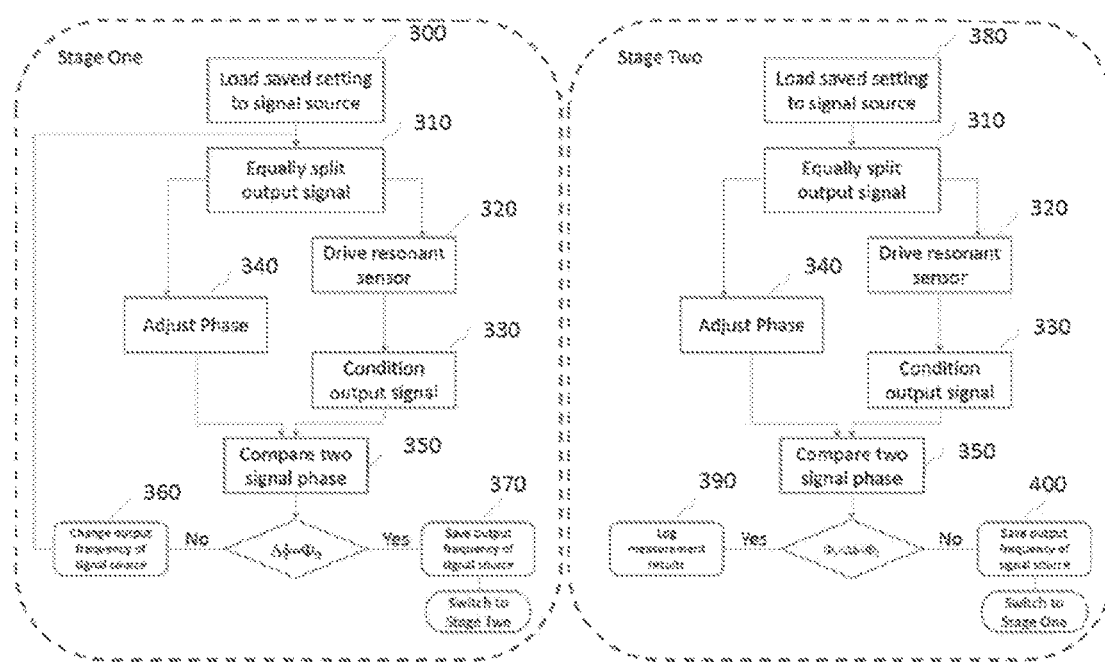
FIG. 3 is a schematic perspective flowchart of a measurement method for a resonant sensor in accordance with the invention.

FIG. 3 is a schematic flowchart of illustration of the method of operation of the resonant sensor based measurement system shown in FIG. 1. The schematic illustration of FIG. 3 shows the combination of the closed loop mode (stage one) with the open loop mode (stage two).

In stage one, the variable signal source responds to a load saved setting in step 300. In step 310, an output of the signal source is equally split by the signal splitter. A first split output signal is used as a first input signal to drive the resonant sensor, in step 320. In step 330 the output signal from the resonant signal is conditioned by signal conditioning components, including the front-end amplifier 104. The term "front-end" refers to the amplifiers position relative to the resonant sensor. The second split output signal is used as the second input signal. In step 340 the phase of the second input signal is adjusted by phase shifter 109. The phase shifted second input signal and the conditioned output signal from the resonant sensor are then compared in step 350 by the phase comparator. If the phase difference between the two signals is not equal to a pre-set phase difference, the output frequency of the signal source is changed in step 360 and the process returns to step 310. If the phase difference between the two signals is equal, the output frequency of the signal source is saved in step 370 and the system switches to stage two.

The flowchart of stage two shows the open loop measurement. The operation is similar to stage one, except after the two signal phases are compared, there is no feedback to adjust the frequency of the input signals. In step 380 the variable frequency signal source provides signals at the frequency saved in step 370. Steps 310 to 350 are then performed as previously described. If in step 350, the phase difference between the two signals is lower than a threshold phase difference from the pre-set phase difference, the system will log the measurement results in step 390. If the phase difference between the two signals is greater than the threshold phase difference from the pre-set phase difference, the output frequency of the signal source is saved in step 400 and the system switches back to step 300 of stage one.

The system described with reference to FIGS. 1 and 3 may be used, for example, to measure specific gravity down a bore hole used in oil and gas exploration. The resonant frequency of the resonant sensor depends on the density of the fluid it is immersed in. For example, if the resonant sensor is immersed in a mixture of oil and water down a bore hole, the resonant frequency of the resonant sensor can provide information on what mixture of oil and water is present. The variation in resonant frequency is very slow and can be described as quasi-static. The use of an open loop measurement allows measurement of such quasi-static measurands, but the initial closed loop synchronisation allows for a large measurement range and automatic operation of the system.

Figure 2:
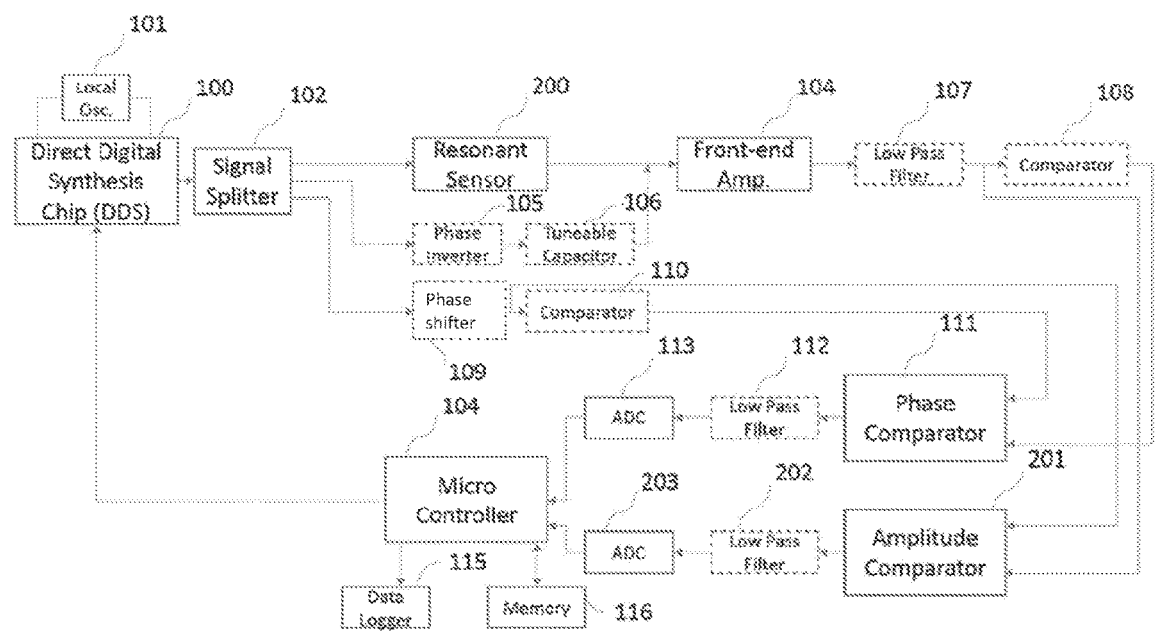
FIG. 2 is a schematic illustration of a second embodiment of a measurement system in accordance with the invention.

FIG. 2 illustrates a second embodiment of a measurement system in accordance with the invention. The system of FIG. 2 is similar to that shown in FIG. 1. However the system of FIG. 2 measures both the phase and amplitude response of the resonant sensor. The system of FIG. 2 is the same as the circuit of FIG. 1 but additionally comprises an amplitude comparator 201, as well as a phase comparator, that receives the first and second input signals. The amplitude comparator 201 receives the first input signal from the resonant sensor, after it has passed through the front-end amplifier 104 and low pass filter 107 and receives the second input signal from the phase shifter 109. The output from the amplitude comparator 201 goes through a second low pass filter 202 and a second analogue-to-digital convertor 203 before being received by the microcontroller 104. The system of FIG. 2 may be used when the resonant sensor has an amplitude response indicative of the input measurand. For example, the resonant sensor may be a mode-localisation sensor comprising two weakly coupled resonant elements, one of which is exposed to the input measurand, as described in WO2011/148137, in which the amplitude ratio between the output of the resonant sensor and second input signal is indicative of the input measurand.

In operation, the system of FIG. 2 operates in the two modes described with reference to FIGS. 1 and 3. In the first mode it is the output of the phase comparator 111 that is used to determine how to alter the frequency of the signals from the DDS and when to switch to the second mode, as shown in FIG. 3. In the second mode, both the phase shift measured by the phase comparator 111 and the amplitude difference measured by the amplitude comparator 201 are recorded by the microcontroller. The input measurand is calculated from the frequency of the input signals and the amplitude difference measured by the amplitude comparator. As in the system of FIG. 1, when the phase difference measured by the phase comparator 111 exceeds a threshold phase difference, the system returns to the closed loop mode.

The invention claimed is:

1. A gravimeter or inertial sensor system, comprising:
a variable frequency signal source, configured to provide a first input signal from a first port and a second input signal from a second port, the first and second input signals having a desired frequency;
a resonant sensor connected to the first port of the variable frequency signal source to receive the first input signal, the resonant sensor having a resonant frequency, an amplitude or a phase response that is dependent on a physical parameter to be measured;
a phase comparator or an amplitude comparator connected to an output of the resonant sensor and to the second port of the variable frequency signal source to receive the second input signal, and configured to compare a phase or an amplitude of an output signal from the resonant sensor with a phase or an amplitude of the second input signal from the variable frequency signal source to provide a phase or amplitude comparator output signal; and
a controller connected to the phase comparator or amplitude comparator, the controller configured in a first mode to connect to the variable frequency signal source and to control the desired frequency of the first and second input signals from the variable frequency signal source based on a value of the phase or amplitude comparator output signal to lock the frequency of the first and second input signals to a resonant frequency of the resonant sensor, and in a second mode, after the frequency of the first and second input signals has been locked to the resonant frequency of the resonant sensor, to disconnect from the variable frequency signal source and to record an open loop output signal indicative of the physical parameter to be measured based on the response of the resonant sensor.

2. A system according to claim 1, wherein the controller is configured such that if the open loop output signal exceeds a threshold value in the second mode, the controller switches back to the first mode.

3. A system according to claim 1 or 2, wherein the variable frequency signal source comprises a direct digital synthesiser (DDS).

4. A system according to any one of the preceding claims, wherein the variable frequency signal source is programmable.

5. A system according to any one of the preceding claims, wherein the variable frequency signal source comprises a signal splitter, wherein the signal splitter generates at least the first and second input signals.

6. A system according to any one of the preceding claims, comprising an amplifier connected between the resonant sensor and the phase or amplitude comparator.

7. A system according to claim 6, comprising a first low pass filter connected between the amplifier and the phase or amplitude comparator.

8. A system according to claim 6 or 7, comprising a first comparator connected between the amplifier and the phase comparator.

9. A system according to any one of the preceding claims, comprising a phase shifter connected between the second port of the variable frequency signal source and the phase comparator.

10. A system according to claim 9, comprising a second comparator connected between the phase shifter and the phase comparator.

11. A system according to any one of the preceding claims, wherein the variable frequency signal source comprises a third port providing a third input signal having the desired frequency, and comprises a feed through signal canceller connected in parallel to the resonant sensor, between the third port of the variable frequency signal source and the amplifier.

12. A system according to any one of the preceding claims, comprising a second low pass filter connected between the phase comparator and the controller.

13. A system according to any one of the preceding claims, comprising an analogue-to-digital convertor connected between the phase or amplitude comparator and the controller.

14. A system according to any one of the preceding claims, comprising an amplitude comparator connected in parallel to the phase comparator, the amplitude comparator being connected between an output of the resonant sensor and the controller and between the second port of the variable frequency signal source and the controller.

15. A system according to claim 14, comprising a third low pass filter connected between the amplitude comparator and the controller.

16. A system according to claim 14 or 15, comprising a second analogue- to-digital convertor connected between the amplitude comparator and the controller.

17. A system according to any one of the preceding claims, wherein the controller comprises a memory.

18. A system according to any one of the preceding claims, wherein the controller comprises a data logger.

19. A system according to any one of the preceding claims, wherein the resonant sensor comprises at least one movable mechanical microstructure.

20. A system according to claim 19, wherein the resonant sensor comprises at least one electromechanical transduction element for actuation, which is connected between the first port of the variable frequency signal source and the mechanical microstructure.

21. A system according to claim 19 or 20, wherein the resonant sensor comprises at least one electromechanical transduction element for detection, one port of which is connected to the mechanical microstructure and another port of which is connected to the phase comparator.

22. A method of operating a gravimeter or inertial sensor system, the gravimeter or inertial sensor system comprising a resonant sensor, the resonant sensor having a resonant frequency or amplitude response that is dependent on a physical parameter to be measured, and a variable frequency signal source connected to an input of the resonant sensor and configured to provide an input signal having a desired frequency to the input of the resonant sensor, the method comprising:
  controlling the variable frequency signal source in a closed loop mode to lock the frequency of the input signal to a resonant frequency of the resonant sensor, and
  after the frequency of the input signal has been locked to the resonant frequency of the resonant sensor, recording an open loop measurement of a response of the resonant sensor.

23. A method according to claim 22, wherein the step of recording an open loop measurement comprises recording the phase response of the resonant sensor.

24. A method according to claim 22 or 23, wherein the step of recording an open loop measurement comprises recording the amplitude response of the resonant sensor.

25. A method according to claim 22, 23 or 24, further comprising the step of automatically returning to the closed loop mode if the open loop measurement exceeds a threshold value.

* * * * *